United States Patent [19]

Nanishi et al.

[11] Patent Number: 4,908,061
[45] Date of Patent: Mar. 13, 1990

[54] ANTIFOULING COATING

[75] Inventors: Kiyoshi Nanishi; Hiroyuki Nakayama, both of Hiratsuka, Japan

[73] Assignee: Kansai Paint Co., Ltd., Hyogo, Japan

[21] Appl. No.: 245,391

[22] Filed: Aug. 30, 1988

Related U.S. Application Data

[62] Division of Ser. No. 929,834, Nov. 13, 1986, abandoned.

[51] Int. Cl.$^4$ ................................................. C09D 5/16
[52] U.S. Cl. ............................. 106/18.31; 106/18.32; 428/907
[58] Field of Search ......................... 106/18.32, 18.31; 528/168

[56] References Cited

U.S. PATENT DOCUMENTS

| | | | |
|---|---|---|---|
| 3,192,242 | 6/1955 | Birum | 260/461 |
| 3,370,020 | 2/1968 | Allcock | 528/168 |
| 3,433,767 | 3/1969 | Marselli | 528/168 |
| 3,455,713 | 7/1969 | Godfrey | 106/165 |
| 3,505,087 | 4/1970 | Godfrey | 106/15 |
| 4,061,606 | 12/1977 | Dieck et al. | 528/168 |

FOREIGN PATENT DOCUMENTS

| | | | |
|---|---|---|---|
| 1360090 | 11/1970 | United Kingdom | |
| 1436351 | 3/1972 | United Kingdom | |
| 1436352 | 3/1972 | United Kingdom | |
| 1425853 | 2/1973 | United Kingdom | |
| 2183240 | 6/1987 | United Kingdom | 106/18.31 |

Primary Examiner—Theodore Morris
Attorney, Agent, or Firm—Fisher, Christen & Sabol

[57] ABSTRACT

Disclosed is an antifouling coating which contains a phosphorus nitride compound and/or a halogenated phosphorus nitride compound and a coating resin as the major components, and which is non-toxic and has excellent long-term antifouling properties when coated on underwater substrates, for example, underwater structures such as ships, fishing nets, and the like.

19 Claims, No Drawings

ANTIFOULING COATING

This is a division application of application Ser. No. 929,834, filed Nov. 13, 1986, now abandoned.

BACKGROUND OF THE INVENTION:

(1) Field of the Invention:

This invention relates to a novel antifouling coating which is coated on underwater substrates, for example, underwater structures such as ships, marine tanks, buoys and the water conduit raceway tubes in the thermoelectric power plant, coastal industrial seawater plants, and fishing nets such as cultivating nets and stationary nets, and which is non-toxic and has long-term antifouling properties.

(2) Description of the Prior Art:

It is a well known fact that various kinds of animals and plants such as barnacle, oyster, ascidian, polyzoan, serupulas, sea lettuce and green laver live in the waters including the seawater, and adhere and grow on the surface of the aforementioned underwater substrates, resulting in doing various damages. Such various damages are done that, adhesion thereof onto the bottom of a ship increases resistance to water to increase shipping service fuel charge, that in the case of the fishing nets, culture productivity is reduced, and so forth.

In order to prevent the aforementioned damages, the antifouling coating prepared by incorporating a toxic antifouling agent such as an organotin compound, copper suboxide or the like, has conventionally been coated thereon. The antifouling mechanism by use of the aforementioned antifouling coating is such that the aforementioned antifouling agent is always leached from the coating film into the water to kill larvae, etc. of the aforementioned underwater animals and plants. However, toxicity of the antifouling agent in the aforementioned antifouling coating is undesirable from the standpoints of the safety and hygiene during the preparation and coating of the aforementioned antifouling coating, and moreover the leaching of the antifouling agent into the water has the possibility of polluting the sea and marine resources.

Recently, researches and developments of the so-called non-toxic antifouling coating free of the toxic antifouling agent have been made. However, the non-toxic antifouling coatings, which have been proposed so far, contain as the major components or are prepared by incorporating silicone rubber, silicone oil, Teflon resin, paraffin wax, and the like, and are all such a type that the surface energy of the coating film is reduced to be water repellent so that adhesion properties thereof to adhesive protains, which are secreted from the interior of the body of the underwater living things when they adhere thereonto, may be reduced to a minimum. However, the results of studies on the aforementioned non-toxic antifouling coatings showed that they have such unsatisfactory antifouling properties as to be significantly poorer compared with the antifouling coatings containing the aforementioned toxic antifouling agents to such an extent that much adhesion of the underwater living things onto the surface thereof was observed several months after submersion under water varying depending on the water area to be unsatisfactory from the practical point of view.

SUMMARY OF THE INVENTION:

It is an object of this invention to provide a novel antifouling coating which is coated on underwater substrates, for example, underwater structures such as ships, marine tanks, buoys and the water conduit raceway tubes in the thermoelectric power plant, coastal industrial seawater plants, and fishing nets such as cultivating nets and stationary nets, to be non-toxic and free of the possibility of polluting the sea and marine resources and has excellent long-term antifouling properties capable of comparing favorably with the toxic antifouling coatings in the prior art and significantly improved compared with the non-toxic antifouling coatings in the prior art.

That is, the present invention provides an antifouling coating containing, as the major components, (i) a phosphorus nitride compound represented by the general formula (I):

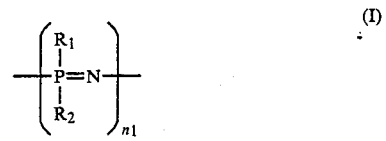

wherein $R_1$ and $R_2$ are $-OR_3$,

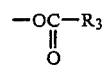

or $-NH-(CH_2)_{n_2}-COOR_3$ and are the same or different, $R_3$ is $C_mH_{2m+1}$ or an aromatic group, $n_1$ is an integer of 3 more, $n_2$ is an integer of 1 to 5, and m is an integer of 1 to 20, and/or (ii) a halogenated phosphorus nitride compound represented by the general formula (II):

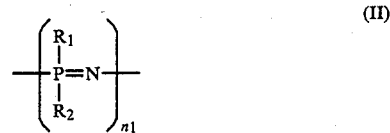

wherein $n_1$ is an integer of 3 or more, at least a part of at least 3 of $R_1$ and of $R_2$ is a halogen atom and the remaining parts of $R_1$ and of $R_2$ are $-OR_3$,

or $-NH-(CH_2)_{n_2}-COOR_3$ and are the same or different respectively, $R_3$ is $C_mH_{2m+1}$, $n_2$ is an integer of 1 to 5, and m is an integer of 1 to 20, and (iii) a coating resin selected from a water-soluble resin and a water-insoluble resin.

The essential feature of the present invention consists in that a cyclic or chain phosphorus nitride compound and/or halogenated phosphorus nitride compound represented by the general formula (I) and/or (II) respectively is contained in a coating in order to exhibit an antifouling function, that is, a function to prevent the underwater living things from adhering underwater onto the surface of the coating film.

The antifouling function of the coating film formed by use of the antifouling coating of the present invention is not sufficiently made clear, but is guessed as the following (i), (ii) and (iii).

(i) The phosphorus nitride compound in the coating film is hydrolyzed underwater to mainly ammonia, phosphoric acid, alcohol and the like, and the halogenated phosphorus nitride compound in the coating film is hydrolyzed underwater to mainly ammonia, phosphoric acid, the halogen molecule, alcohol and the like to be gradually leached into the water respectively. Accordingly, since the leaching due to hydrolysis always takes place underwater, it is difficult for the larvae, etc. of the underwater living things to adhere onto such a surface of the coating film.

(ii) Further, since these hydrolyzates are low molecular weight compounds, as a period of time of submersion under water becomes longer, the surface of the coating film becomes smooth, resulting in making it more difficult for the underwater living things to adhere thereonto in addition to the difficulty in the aforementioned (i).

(iii) Moreover, with respect to the concentration gradient of the hydrolyzates being leached from the surface of the coating film, the concentration is the highest in the neighborhood of the coating film, and particularly, although ammonia, phosphoric acid, halogen molecule, etc. are nutriments for the underwater living things, their concentrations in the neighborhood of the coating film are so high as to make it difficult for the underwater living things to grow. Of course, these hydrolyzates are useful as nutriments when diffused and diluted in the water.

Moreover, the phosphorus nitride compound and the halogenated phosphorus nitride compound used in the present invention and the hydrolyzates thereof are non-toxic and never kill the underwater living things, resulting in rather providing the nutriments.

DETAILED DESCRIPTION OF THE INVENTION

The antifouling coating of the present invention will be explained more in detail hereinbelow.

The antifouling coating of the present invention contains (i) a phosphorus nitride compound and/or (ii) a halogenated phosphorus nitride compound represented by the general formula (I) and/or (II) respectively and (iii) a coating resin selected from a water-soluble resin and a water-insoluble resin.

The phosphorus nitride compound is a cyclic or chain compound represented by the aforementioned general formula (I), hydrolysis of which makes it possible to prevent the underwater living things from adhering and growing thereon.

The underwater hydrolysis of the phosphorus nitride compound is considered to take place as follows.

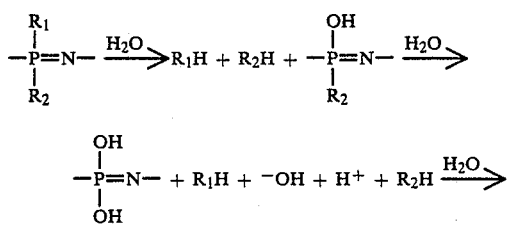

$$O=P(OH)_3 + R_1H + {}^-OH + H^+ + R_2H + NH_3$$

It is considered that the aforementioned hydrolysis and the resulting hydrolyzates cause to exhibit the antifouling functions as described in (i) to (iii) hereinabove.

$R_1$ and $R_2$ in the phosphorus nitride compound represented by the general formula (I) are preferably —$OR_3$ or

and m in $R_3$ is suitably in the range of 1 to 10. $R_1$ and $R_2$ may be the same or different, $n_1$ is an integer of 3 or more, practically 3 to 10000. Specific examples of the phosphorus nitride compound include cyclic compounds such as propoxyphosphorus nitride, ethoxyphosphorous nitride, butoxyphosphorous nitride, phenoxyphosphorus nitride, phenoxypropoxyphosphorus nitride, acetoxyphosphorus nitride, isobutoxyphosphorus nitride, isopropoxyphosphorus nitride, sec-butoxyphosphorus nitride, phosphorus nitride glycine ethyl ester and acetoxypropoxyphosphorus nitride, and chain compounds such as polypropoxyphosphorus nitride. Of these, propoxyphosphorus nitride, butoxyphosphorus nitride, phenoxypropoxyphosphorus nitride, ethoxyphosphorus nitride, polypropoxyphosphorous nitride and the like are particularly preferred.

The halogenated phosphorus nitride compounds are cyclic or chain compounds represented by the general formula (II), hydrolysis of which makes it possible to prevent the underwater living things from adhering and growing thereon.

The underwater hydrolysis of the halogenated phosphorus nitride compound is considered to take place, for example, when $R_1$ is a halogen atom as follows. X in the following equation of hydrolysis represents a halogen atom.

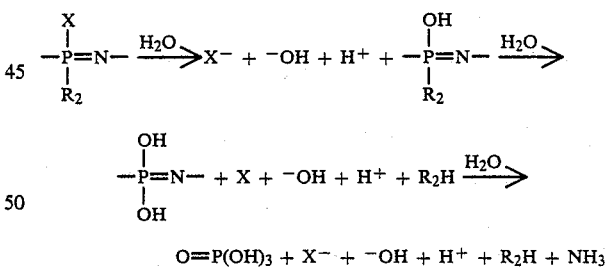

$$O=P(OH)_3 + X^- + {}^-OH + H^+ + R_2H + NH_3$$

It is considered that the aforementioned hydrolysis and the resulting hydrolyzates cause to exhibit the antifouling functions as described in (i) to (iii) hereinabove.

In the halogenated phosphorus nitride compound represented by the general formula (II), the halogen atom in $R_1$ or $R_2$ is an atom selected from fluorine, chlorine, bromine and iodine, preferably chlorine, bromine and iodine, $R_1$ and $R_2$ preferably —$OR_3$ or

m in $R_3$ is suitably 1 to 10, $n_1$ is an integer of 3 or more, preferably 3 to 10000. The content of the halogen atom in the halogenated phosphorus nitride is 1% by weight or more, preferably in the range of from 5 to 60% by weight based on the halogenated phosphorus nitride compound.

Specifically, the halogenated phosphorus nitride compound includes cyclic compounds such as alkoxy derivatives such as methoxy, ethoxy, propoxy, isopropoxy, butoxy, isobutoxy, t-butoxy, sec-butoxy, pentoxy and octoxy of chlorine-containing chlorophosphorus nitrides, chlorine-containing phenoxychlorophosphorus nitrides, chlorine-containing chlorophosphorus nitride benzyl alcohol, chlorine-containing chlorophosphorus nitride glycine ethyl ester, chlorine-containing acetoxychlorophosphorus nitrides, and the formate, acetate, and propionate of chlorine-containing chlorophosphorus nitrides, and the like; and chain compounds such as chlorine-containing polyphenoxychlorophosphorus nitrides.

The coating resin in the present invention is mixed with the phosphorus nitride compound and/or the halogenated phosphorus nitride compound in order to cause the compound to be fixed in the coating film and is selected for use from resins which are capable of forming a highly water-resistant coating film.

Specifically, the coating resin is classified into two groups, that is, a water-soluble resin which is gradually leached from the coating film formed therefrom into water, and a water-insoluble resin, little or none of which is leached therefrom into water. The water-soluble resin includes carboxyl group-containing resins having an acid value of 10 or more, polyamide resins having an amine value of 50 or more, and the like. Examples of the carboxyl group-containing resin include rosin, acrylic resin, vinyl resin, alkyd resin, polyester resin, oil varnish, maleic diene resin and the like. The polyamide resin includes the reaction products of aliphatic polyamines or aromatic polyamines with polycarboxylic acids. Cellulose and derivatives thereof such as hydroxypropylcellulose and hydroxyethylcellulose propionate may also be used as the water-soluble resin. These water-soluble resins all have a rate of leaching into water preferably in the range of from 1500 $\mu g/cm^2$/day to 20000 $\mu g/cm^2$/day.

On the other hand, the water-insoluble resin is a resin having a rate of leaching into water less than that in the water-soluble resin. Examples of the water-insoluble resin include natural resins such as shellac and copal, acrylic resin, alkyd resin, polyester resin, epoxy resin, vinyl resin, diene resin, olefin resin, halogenated polyolefin, phenol resin, petroleum resin, rubber resin, cellulose derivatives such as cellulose propionate and cellulose acetate butylate polysiloxane resin and the like.

The ratio of the amount of the phosphorous nitride compound and/or the halogenated phosphorus nitride compound to the amount of the coating resin in the present invention may be arbitrarily selected depending on the purpose for which the antifouling coating is used, the water area where the underwater substrate is located and so forth and is not limited, but normally, the phosphorus nitride compound and/or the halogenated phosphorus nitride compound may also be incorporated in a small amount when mixed with the water-soluble resin and is preferably incorporated in as large amounts as possible when mixed with the water-insoluble resin, because when mixed with the water-soluble resin, which is gradually leached into water along with the phosphorus nitride compound and/or the halogenated phosphorus nitride compound, the phosphorous nitride compound and/or the halogenated phosphorus nitride compound is successively exposed onto the surface of the coating film being always eroded to exhibit the antifouling properties, while when mixed with the water-insoluble resin, the phosphorus nitride compound and/or the halogenated phosphorus nitride compound is leached into water, but the water-insoluble resins as the coating film, resulting in that the phosphorus nitride compound and/or the halogenated phosphorus nitride compound is preferably incorporated in large amounts in the coating film in order to maintain the antifouling properties for a long period of time. Specifically, the phosphorus nitride compound and/or the halogenated phosphorus nitride compound is incorporated in an amount of 5 to 300 parts by weight, preferably 10 to 200 parts by weight per 100 parts by weight of the water-soluble resin when mixed with the water-soluble resin, and in an amount of 5 to 300 parts by weight, preferably 10 to 270 parts by weight per 100 parts by weight of the water-insoluble resin when mixed with the water-insoluble resin. Of these, in order to maintain the antifouling properties for a long period of time, the phosphorus nitride compound and/or the halogenated phosphorus nitride compound is incorporated in an amount of preferably 20 to 300 parts by weight, more preferably 30 to 270 parts by weight per 100 parts by weight of the water-insoluble resin.

The antifouling coating of the present invention contains the phosphorus nitride compound and/or the halogenated phosphorus nitride compound and the coating resin as the major components, but is desirably dissolved or dispersed in an organic solvent so as to be easily handled in coating operation, and so forth.

Typical and advantageous examples of the aforementioned organic solvent include aromatic hydrocarbons such as benzene, toluene, xylene and the like, ketones such as methyl ethyl ketone, methyl isobutyl ketone and the like, esters such as ethyl acetate, ethylene glycol monoethyl ether acetate and the like, and alcohols such as methanol, ethanol, isopropyl alcohol and the like.

Coating of the antifouling coating of the present invention may be carried out by the conventional coating methods such as brushing, spray coating, roller coating and the like, and the coating film thickness is preferably in the range of from 10 to 300 $\mu$ as the dry coating film.

The antifouling properties of the underwater substrates, on which the antifouling coating of the present invention is coated, have such technical effects as to be compared favorably with the toxic antifouling coatings containing toxic antifouling agents in the prior art and to be non-toxic.

That is, the present invention provides the antifouling coating, which is coated on the aforementioned underwater substrates to be non-toxic and free of the possibility of polluting the sea and marine resources, and has excellent long-term antifouling properties capable of comparing favorably with the toxic antifouling coatings in the prior art and significantly improved compared with the non-toxic antifouling coatings in the prior art.

The present invention will be described more in detail by the following Examples and Comparative Examples.

EXAMPLES 1–13

The antifouling coating having the compositions and the formulating ratios in terms of parts by weight of solids shown in Table 1 were prepared respectively.

Comparative Example 1

A coating containing the cellulose propionate solution in Example 1 and not containing the phosphorus nitride compound (A) in Example 1 was prepared.

Comparative Example 2

An antifouling coating was prepared by mixing cellulose propionate with copper suboxide in an amount of 10% by weight.

Comparative Example 3

An antifouling coating was prepared by incorporating 20% by weight of triphenyltin hydroxide into a resin component containing vinyl chloride resin and rosin.

Explanations are given on Table 1 as follows.

"Cellulose propionate solution (*1)" is prepared by dissolving cellulose propionate (marketed by DAICEL LTD.) in a mixed solvent of 1:1:1 (by weight) of toluene:methyl ethyl ketone:isopropanol to be 25% by weight.

"Halogenated polypropylene (*2)" is prepared by dissolving halogenated polypropylene having a degree of chlorination of 30% and a molecular weight of 40,000 in a mixed solvent of toluene and xylene to form a solution of 20% by weight.

"CAB solution (*3)" is prepared by dissolving cellulose acetate butylate in the mixed solution in (*1) to be 25% by weight.

"Acrylic resin solution (*4)" is prepared by dissolving a copolymer (molecular weight 7000) of 40:25:20:10:5 (by weight ratio) of methyl methacrylate:styrene:isobutyl acrylate:2-hydroxyethyl methacrylate:acrylic acid in a mixed solvent of 1:1 (by weight ratio) of toluene:isopropanol to be 30% by weight.

"Rosin (*5)" is Chinese gum rosin (marketed by KAMIO SHOJI).

(*6)-(A): A mixture of 25 parts by weight of propoxyphosphorus nitride and 50 parts by weight of isopropanol.

(*6)-(B): A mixture of 25 parts by weight of butoxyphosphorus nitride and 50 parts by weight of isopropanol.

(*6)-(C): A mixture of 25 parts by weight of phenoxypropoxyphosphorus nitride and 50 parts by weight of isopropanol.

(*6)-(D): A mixture of 25 parts by weight of polypropoxyphosphorus nitride and 50 parts by weight of isopropanol.

(*6)-(E): A mixture of 25 parts by weight of ethoxyphosphorus nitride and 50 parts by weight of isopropanol.

(*7) Seawater immersion test results:

The coatings shown in the Examples and the Comparative Examples were coated on the mild steel sheets, to which a rust proof coating had been applied beforehand to a film thickness of 100 μ, to be a thickness of 100 μ as the dry film, and was dried for 10 days at normal temperature. The resulting coated test sheets were subjected to seawater immersion for 6 months off the coast of Orito, Shimizu harbor, Shizuoka-ken, Japan, followed by observation of the state of the surface of the coating film respectively. Results are shown in Table 1. In the seawater immersion test results of Table 1, the numerical values all represent rates (%) of areas in which the underwater living things such as a barnacle and a green laver adhere onto the coating film surface respectively.

TABLE 1

| | | Examples | | | | | | | | | | | | | Comparative Examples | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 1 | 2 | 3 |
| Coating resins | | | | | | | | | | | | | | | | | |
| Cellulose propionate solution | (*1) | 100 | 100 | 100 | 100 | 100 | 100 | | | | | | | | | | |
| Halogenated propylene resin | (*2) | | | | | | | 100 | | | | | | | | | |
| CBA solution | (*3) | | | | | | | | | 100 | | | | | | | |
| Acrylic resin solution | (*4) | | | | | | | | | | 100 | | | 100 | | | |
| Rosin | (*5) | | | | | | | | | | | 100 | | | Compositions are separately described respectively | | |
| Polysiloxane | | | | | | | | | | | | | 100 | | | | |
| Polyester resin | | | | | | | | | | | | | | 100 | | | |
| Phosphorus nitride compounds | (*6) | | | | | | | | | | | | | | | | |
| (A) | | 200 | 150 | 100 | 50 | | | | | | 150 | | | | | | |
| (B) | | | | | | 150 | | | 110 | | | | | | | | |
| (C) | | | | | | | 130 | | | | | 180 | | | | | |
| (D) | | | | | | | | | | 200 | | | 150 | | | | |
| (E) | | | | | | | | | | | 150 | | | 110 | | | |
| Seawater immersion test results | (*7) | | | | | | | | | | | | | | | | |
| barnacle | | 0 | 0 | 0 | 0 | 0 | 0 | 0 | 0 | 0 | 0 | 0 | 0 | 0 | 80 | 0 | 0 |
| green laver | | 0 | 0 | 0 | 0 | 0 | 0 | 0 | 0 | 0 | 0 | 0 | 0 | 0 | 100 | 0 | 0 |

EXAMPLES 14–23

The antifouling coatings having the compositions and the formulating ratios in terms of parts by weight of solids shown in Table 2 were prepared respectively.

Comparative Example 4

The same as Comparative Example 1.

Comparative Example 5

A coating was prepared by mixing copper suboxide in an amount of 10% by weight with vinyl chloride resin.

Comparative Example 6

A moisture-curing type silicone resin coating was prepared.

Explanations are given on Table 2 as follows.

(*1) therein is the same as (*1) in Table 1.

(*2) therein is the same as (*3) in Table 1.

"Acrylic resin solution (*3)" is prepared by dissolving a copolymer of 8:2 (by weight ratio) of methyl methacrylate:2-hydroxyethyl methacrylate in a mixed solvent of 1:1 (by weight ratio) of toluene:isopropanol to be 30% by weight.

(*4) therein is the same as (*5) in Table 1.

(*5)-(A): A mixture of 25 parts by weight of propoxychlorophosphorus nitride having a chlorine content of 25% by weight with 50 parts by weight of isopropanol.

(*5)-(B): A mixture of 25 parts by weight of propoxychlorophosphorus nitride having a chlorine content of 10% by weight with 50 parts by weight of isopropanol.

(*5)-(C): A mixture of 25 parts by weight of butoxychlorophosphorus nitride having a chlorine content of 50% by weight with 50 parts by weight of butanol.

(*5)-(D): A mixture of 25 parts by weight of octylchlorophosphorus nitride having a chlorine content of 15% by weight with 50 parts by weight of butanol.

(*5)-(E): A mixture of 25 parts by weight of chlorophosphorus nitride acetate having a chlorine content of 15% by weight with 50 parts by weight of butanol.

(*6) therein is the same as (*7) in Table 1 except that the dry film thickness is 150–200 μ.

TABLE 2

| | | Examples | | | | | | | | | | Comparative Examples | | |
|---|---|---|---|---|---|---|---|---|---|---|---|---|---|---|
| | | 14 | 15 | 16 | 17 | 18 | 19 | 20 | 21 | 22 | 23 | 4 | 5 | 6 |
| Coating resins | | | | | | | | | | | | | | |
| Cellulose propionate solution | (*1) | 100 | 100 | 100 | 100 | 100 | 100 | 100 | | | | | | |
| Cellulose acetate butylate solution | (*2) | | | | | | | | 100 | | | | | |
| Acrylic resin solution | (*3) | | | | | | | | | 100 | 100 | Compositions are separately described respectively | | |
| Rosin | (*4) | | | | | | | | | | 30 | | | |
| Halogenated phosphorus nitride compounds | (*5) | | | | | | | | | | | | | |
| (A) | | 75 | 30 | 15 | | | | | | 75 | 75 | 75 | | |
| (B) | | | | | 25 | | | | | | | | | |
| (C) | | | | | | 25 | | | | | | | | |
| (D) | | | | | | | 25 | | | | | | | |
| (E) | | | | | | | | 25 | | | | | | |
| Seawater immersion test results | (*6) | | | | | | | | | | | | | |
| barnacle | | 0 | 30 | 10 | 10 | 10 | 10 | 0 | 0 | 0 | 0 | 60 | 0 | 100 |
| green laver | | 0 | 5 | 10 | 5 | 5 | 5 | 5 | 0 | 0 | 0 | 80 | 0 | 80 |

EXAMPLES 24–27

The antifouling coatings having the compositions and the formulating ratios in terms of parts by weight of solids shown in Table 3 were prepared respectively.

Explanations are given on Table 3 as follows.

(*1) therein is the same as (*1) in Table 1.
(*2) therein is the same as (*4) in Table 1.
(*3)-(A) therein is the same as (*6)-(A) in Table 1.
(*3)-(B) therein is the same as (*6)-(B) in Table 1.
(*4)-(A) therein is the same as (*5)-(A) in Table 2.
(*4)-(B) therein is the same as (*5)-(B) in Table 2.
(*5) therein is the same as (*7) in Table 1.

TABLE 3

| | | Examples | | | |
|---|---|---|---|---|---|
| | | 24 | 25 | 26 | 27 |
| Coating resins | | | | | |
| Cellulose propionate solution | (*1) | 100 | 100 | | |
| Acrylic resin solution | (*2) | | | 100 | 100 |
| Phosphorus nitride compounds | (*3) | | | | |
| (A) | | 75 | | 75 | |
| (B) | | | 75 | | 75 |
| Halogenated phosphorus nitride compounds | (*4) | | | | |
| (A) | | 75 | | 75 | |
| (B) | | | 75 | | 75 |
| Seawater immersion test results | (*5) | | | | |
| barnacle | | 0 | 0 | 0 | 0 |
| green laver | | 0 | 0 | 0 | 0 |

What is claimed is:

1. An antifouling underwater substrate comprising an underwater substrate having coated thereon a coating containing, as the major component, (i) a phosphorus nitride compound represented by the general formula (1):

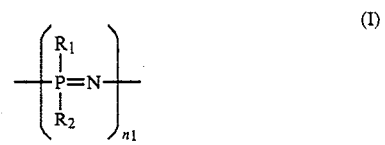

wherein $R_1$ and $R_2$ are $-OR_3$,

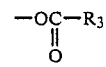

or $-NH-(CH_2)_{n_2}-COOR_3$ and are the same or different, $R_3$ is $C_mH_{2m+1}$ or an aromatic group, $_1$ is an integer of 3 or more, $n_2$ is an integer of 1 to 5, and m is an integer of 1 to 20, and/or (ii) a halogenated phosphorus nitride compound represented by the general formula (II):

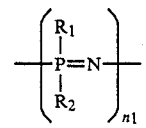

wherein $n_1$ is an integer of 3 or more, at least a part of $R_1$ and of $R_2$ is a halogen atom and the remaining parts of $R_1$ and of $R_2$ are $-OR_3$, or $-NH-(CH_2)_{n_2}-COOR_3$ and are the same or different respectively, $R_3$ is $C_mH_{2m+1}$, $n_2$ is an integer of 1 to 5, and m is an integer of 1 to 20, and (iii) a coating resin selected from a water-soluble resin and a water-insoluble resin, with the phosphorus nitride compound (i) and/or the halogenated phosphorus nitride compound (ii) being leached into the water to thereby prevent fouling.

2. An antifouling underwater substrate as claimed in claim 1, wherein $R_1$ and $R_2$ in the phosphorus nitride compound represented by the general formula (1) are $-OR_3$ or

m in $R_3$ is in the range of 1 to 10, and $n_1$ is in the range of 3 to 10,000.

3. An antifouling underwater substrate as claimed in claim 2, wherein the phosphorus nitride compound is selected from cyclic compounds such as propoxyphosphorus nitride, ethoxyphosphorus nitride, butoxyphosphorus nitride, phenoxyphosphorus nitride, phenoxyproxyphosphorus nitride, acteoxyphosphorus nitride, isobutoxyphosphorus nitride, isopropoxyphosphorus nitride, sec-butoxyphosphorus nitride, phosphorus nitride glycine ethyl ester and acetoxypropoxyphosphorus nitride, and chain compounds such as polypropoxyphosphorus nitride.

4. An antifouling underwater substrate as claimed in claim 2, wherein the phosphorus nitride compound is selected from propoxyphosphorus nitride, butoxyphosphorus nitride, phenoxypropoxyphosphorus nitride, ethoxyphosphorus nitride and polypropoxyphosphorus nitride.

5. An antifouling underwater substrate as claimed in claim 11, wherein the halogen atom is contained in an amount of 1% by weight or more in the halogenated phosphorus nitride compound.

6. An antifouling underwater substrate as claimed in claim 1, wherein the halogen atom is contained in an amount of 5 to 60% by weight in the halogenated phosphorus nitride compound.

7. An antifouling underwater substrate as claimed in claim 1, wherein the halogen atom represented by $R_1$ or $R_2$ in the halogenated phosphorus nitride compound of the general formula (II) is fluorine, chlorine, bromine or iodine, $R_1$ and $R_2$ therein are also $-OR_3$

m in $R_3$ is in the range of 1 to 10, and $n_1$ is in the range of 3 to 10,000.

8. An antifouling underwater substrate as claimed in claim 7, wherein the halogenated phosphorus nitride compound is selected from cyclic compounds such as alkoxy derivatives such as methoxy, ethoxy, propoxy, isopropoxy, butoxy, isobutoxy, t-butoxy, sec-butoxy, pentoxy and octoxy of chlorine-containing chlorophosphorus nitrides, chlorine-containing phenoxychlorophosphorus nitrides, chlorine-containing chlorophosphorus nitride benzyl alcohol, chlorine-containing chlorophosphorus nitride glycine ethyl ester, chlorine-containing acetoxychlorophosphorus nitrides, and the formate, acetate and propionate of chlorine-containing chlorophosphorus nitrides, and chain compounds such as chlorine-containing polyphenoxychlorophosphorus nitrides.

9. An antifouling underwater substrate as claimed in claim 8, wherein the halogen atom is chlorine, bromine or iodine.

10. An antifouling underwater substrate as claimed in claim 1, wherein the water-soluble resin is selected from carboxy group-containing resins having an acid value of 10 or more, polyamide resins having an amine value of 50 or more, and cellulose and derivatives thereof.

11. An antifouling underwater substrate as claimed in claim 10, wherein the carboxyl group-containing resin is selected from rosin, acrylic resin, vinyl resin, alkyd resin, polyester resin, oil varnish and maleic diene resin.

12. An antifouling coating underwater substrate as claimed in claim 10, wherein the polyamide resin is selected from the reaction products of aliphatic polyamines or aromatic polyamines with polycarboxylic acids.

13. An antifouling underwater substrate as claimed in claim 10, wherein the cellulose and derivatives thereof are hydroxpropylcellulose and hydroxethylcellulose propionate.

14. An antifouling underwater substrate as claimed in claim 10, wherein the water-soluble resin has a rate of leaching into water in the range of from 1500 $\mu g/cm_2/day$ to 20,000 $\mu g/cm_2/day$.

15. An antifouling underwater substrate as claimed in claim 11, wherein the water-insoluble resin is selected from natural resins such as shellac and copal, acrylic resin, alkyd resin, polyester resin, epoxy resin, vinyl resin, diene resin, olefin resin, halogenated polyolefin, phenol resin, petroleum resin, rubber resin, cellulose derivatives such as cellulose propionate and cellulose acetate butylate and polysiloxane resin.

16. An antifouling underwater substrate as claimed in claim 1, wherein the phosphorus nitride compound and/or the halogenated phosphorus nitride compound is incorporated in an amount of 5 to 300 parts by weight per 100 parts by weight of the water-soluble resin when mixed with the water-soluble resin, and in an amount of 5 to 300 parts by weight per 100 parts by weight of the water-insoluble resin when mixed with the water-insoluble resin.

17. An antifouling underwater substrate as claimed in claim 11, wherein the phosphorus nitride compound and/or the halogenated phosphorus nitride compound is incorporated in an amount of 10 to 200 parts by weight per 100 parts by weight of the water-soluble resin when mixed with the water-soluble resin, and in an amount of 10 to 270 parts by weight per 100 parts by weight of the water-insoluble resin when mixed with the water insoluble resin.

18. An antifouling an underwater substrate as claimed in claim 11, wherein the phosphorus nitride compound and/or the halogenated phosphorus nitride compound is incorporated in an amount of preferably 20 to 300 parts by weight, more preferably 30 to 270 parts by weight per 100 parts by weight of the water-insoluble resin.

19. An antifouling underwater substrate as claimed in claim 1, wherein (ii) the halogenated phosphorus nitride compound is essentially contained as the major component.

* * * * *